Feb. 24, 1931.  A. W. CAPS ET AL  1,794,347

PHOTOGRAPHIC COPYING MACHINE

Filed May 25, 1923

Inventors
Arthur W. Caps
Ivan Leisinger

By
Attorney

Patented Feb. 24, 1931

1,794,347

UNITED STATES PATENT OFFICE

ARTHUR W. CAPS AND IVAN E. LEININGER, OF KANSAS CITY, MISSOURI, ASSIGNORS, BY MESNE ASSIGNMENTS, TO PHOTOSTAT CORPORATION, OF PROVIDENCE, RHODE ISLAND, A CORPORATION OF RHODE ISLAND

PHOTOGRAPHIC COPYING MACHINE

Application filed May 25, 1923. Serial No. 641,471.

The present invention relates to improvements in cameras and similar photographic apparatus and especially to photographic copying machines of the general class wherein photographic prints or copies are obtained by exposing images of the originals or objects on a strip or sheet of sensitized paper or other material and then developing and fixing the exposed portion of the paper to produce the finished prints, an example of a machine of this class being illustrated and described in Letters Patent No. 929,757, granted August 3, 1909, to Calvin J. Ellis.

The primary object of the invention is to provide a novel and improved machine of this class whereby exposures may be made through the same lens successively on the opposite sides of photographic paper or material which has been sensitized on both sides, the machine in its preferred embodiment comprising means for supporting a sheet of sensitized paper so that it may be turned, thereby enabling the two surfaces of the paper to be presented successively toward a lens so as to receive images thereon in succession.

To these and other ends, the invention consists in certain improvements and combinations and arrangements of parts, all as will be hereinafter more fully described, the features of novelty being pointed out particularly in the claims at the end of the specification.

In the accompanying drawings:—

Similar parts are designated by the same reference characters in the several views.

Figure 1:
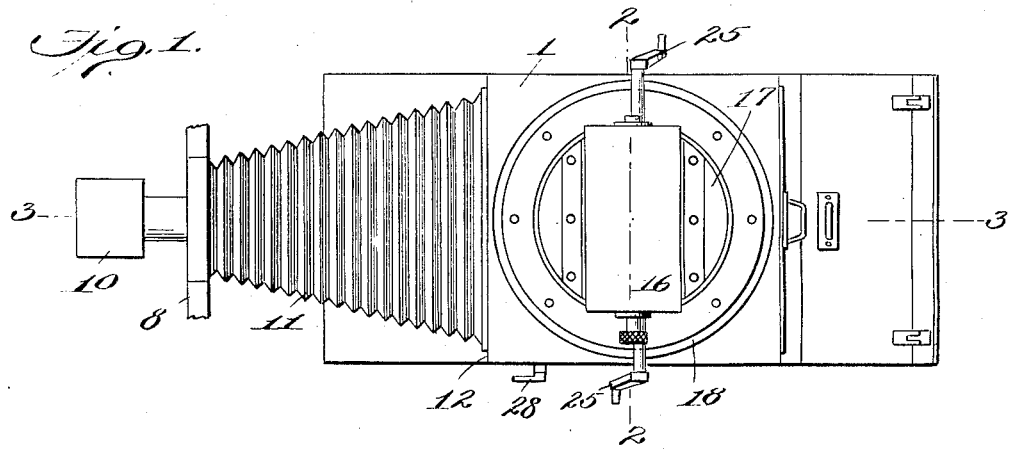
Figure 1 is a top plan view of a photographic copying machine constructed in accordance with the present invention.
Figure 2:
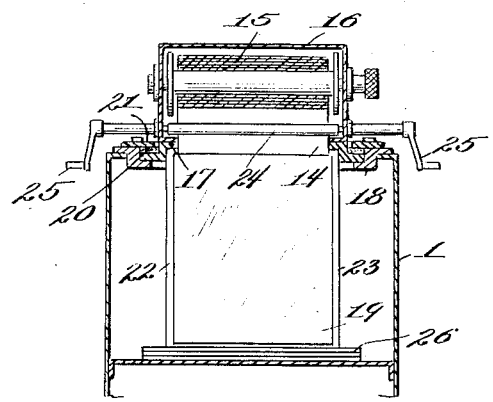
Figure 2 represents a transverse vertical section through the machine, taken on the line 2—2, Figure 1.

The present invention is applicable generally to cameras or photographic machines of the kinds used generally for the copying or photographic reproduction of documents, records of various kinds and the like, such machines usually embodying means for developing and fixing the photographic paper or material after it has been exposed through the lens. The preferred embodiment of the invention is shown in the accompanying drawings and will be hereinafter described in detail, but it is to be understood that the invention is not restricted to the precise construction shown, as equivalent constructions are contemplated and these will be included within the scope of the claims.

In the present instance, a photographic copying machine is shown which comprises a suitable table or base 1 which may be of any appropriate construction, but is preferably of sheet metal construction, a copy board 2 being provided at one end of the table to support the object or original to be photographed, the copy board being mounted to slide vertically on rods 3 so that the elevation of the copy board may be varied as desired. The camera is mounted preferably on the upper side of the table, for which purpose the top of the table is provided with blocks 4 which are grooved longitudinally to slidingly receive rails 5, the latter being preferably tubular, as shown, and providing a sliding track for the camera 6, the camera being provided on its underside with blocks 7 which are grooved longitudinally to correspond with the blocks 4 and slidingly engage the rails 5, accurate guiding of the camera in its longitudinal movements being thus insured. The rails 5 are attached at their forward ends to a bracket 8 which carries the camera lens 9 and also a prism 10, by which the light rays rising vertically or substantially so, from an object or original resting on the copy board are bent or deflected horizontally, or substantially so, into the camera. The front end of the camera bellows 11 is attached to the bracket 8, the rear end of the bellows being attached to the front wall 12 of the camera, this front wall having an aperture 13, through which the light rays passing through the lens may reach the sensitized paper or material within the camera.

Suitably sensitized materials of different kinds may be exposed within the camera, it being preferable, however, to employ a strip of paper which is sensitized on both sides. As shown, the strip of paper 14 which is sensitized on both sides is supplied in the form of a roll 15, this roll being suitably mounted and enclosed within a box 16 which is carried on a revolving frame or turn table 17, the latter being formed preferably with a circular periphery or flange which rests in or is rotatably supported by a track 18, the latter being secured in the top of the camera. The rotatable frame or turn table carries means for supporting or positioning the sensitized paper for exposure through the camera lens, the sensitized paper supporting means being so constructed and arranged that the sensitized paper to be exposed will lie in a plane which coincides with the axis of rotation of the frame or turn table 17 so that rotation of the frame or turn table 17 to bring one or another side of the paper into position for exposure will not alter the focus. Preferably and as shown, a pair of clear glass plates 19 are attached to brackets 22 and 23 which form part of and project downwardly from the frame or turn table 17, these glass plates being mounted so that they will intersect the light rays passing through the lens, these glass plates being spaced sufficiently to provide a passageway between them for the sensitized paper 14, the space between the glass plates lying in the focal plane of the camera and coinciding with the axis of rotation of the frame or turn table 17. Either or both of these glass plates 19 may be removable so that a ground glass may be substituted for focusing purposes, if desired. The rotatable or reversible frame or turn table 17 has a light tight fit in the top of the camera, it being preferable to provide a felt ring 20 above the peripheral edge of the frame or turn table and to fit a ring 21 on the top of the camera, this ring overlying the felt ring 20 to form a light tight joint and to also retain the frame or turn table 17 in position. In the preferred construction and as shown, the rotatable or reversible frame 17 carries the supply of sensitized paper, and feed rolls 24 are also preferably provided in the lower portion of the box 16, these feed rolls being operable from the exterior of the box 16 by cranks 25 which project from the opposite ends thereof so that the paper may be advanced, following each exposure, while the frame or turn table 17 is in either of its two positions.

Figure 3:
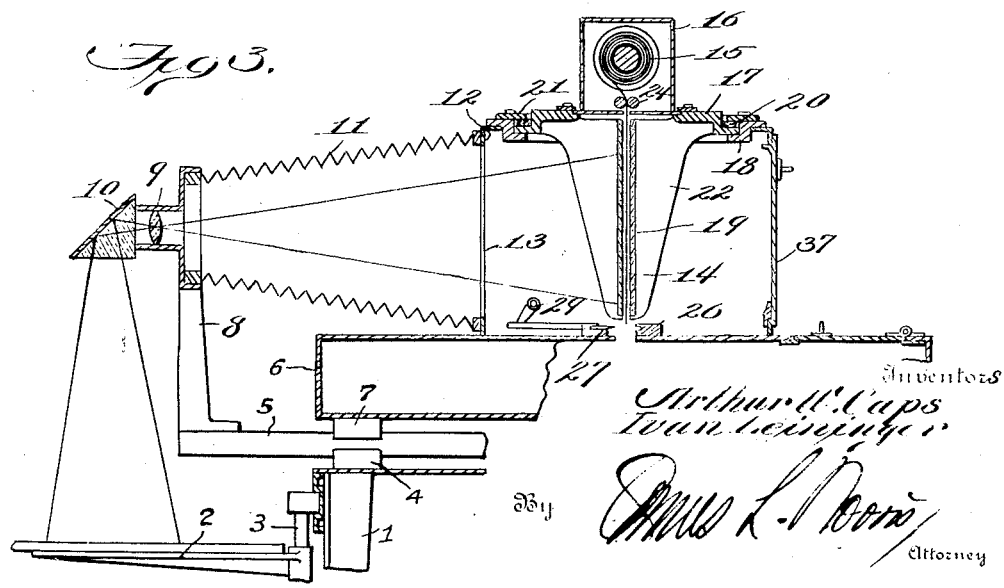
Figure 3 represents a longitudinal vertical section through the machine taken on the line 3—3, Figure 1.

Means is provided for severing each exposed portion of the photographic paper from the remainder thereof, after such portion has been advanced from the field of exposure, a knife being provided for this purpose in the present instance, which comprises a relatively fixed knife bar 26 and a reciprocatory knife bar 27, the latter being operable from a handle 28 on the exterior of the camera through the medium of a shaft 29 which is operatively connected to the knife bar 27. Normally the knife bar 27 is in its retracted position, as shown in Figure 3, the paper being then unobstructed so that it may be fed downwardly from the field of exposure.

The machine may be used in conjunction with means, such as that shown in the patent referred to above, for successively receiving the exposed portions of the photographic paper and for developing and fixing the same.

The rear wall of the camera opposite to the opening 13 may be provided with a door 37, this door being adapted to be opened or removed to permit focussing of the image on a ground glass substituted for one of the clear glasses 19.

The mode of operation of a photographic machine constructed as hereinbefore described is as follows: A roll of paper is inserted in the paper roll box 16 and the end thereof is threaded downwardly between the rolls 24 and the clear glass plates 19 until the lower edge of the paper is in line with the knife bar 27, it being assumed that the machine has been previously focused, for example, by shifting the camera 6 on the rails 5. An exposure from the object or original on the copy board 2 is then made upon that side of the photographic paper 14 which is presented toward the lens 9, it being assumed that the frame or turn table 17 has been brought into such a position that the glass plates 19 are perpendicular to the optical axis of the lens 9. After an exposure has been thus made on one side of the photographic paper, the frame or turn table 17 is rotated through a half revolution, the glass plates 19 and the interposed paper being thus reversed so that the second or unexposed side of the photographic paper is directed toward the lens 9, whereupon a second exposure is made, thus producing an exposure upon the second side of the paper. After both sides of the paper have been exposed, the crank 25 may be turned to advance the paper, a fresh portion of the paper being thus brought into the field of exposure between the glass plates 19 and the exposed portion of the paper being fed downwardly into the developing and fixing apparatus, and after developing and fixing of this portion of the paper has been completed, the handle 28 is operated to shift the knife bar 27 toward the cooperative knife bar 26, the exposed and developed portion of the paper being thereby severed from the paper strip.

By providing means for reversibly positioning the sensitized paper or material in the focal plane of the lens, the opposite sides of photographic paper or material sensitized on both sides, may be successively exposed through the same lens, and hence the operations of photographing documents, records and the like to obtain prints thereof on opposite sides of the paper is facilitated. The same machine may be used for exposing photographic paper or other material sensitized on one side only, when such is desired, in which case it would be unnecessary to reverse the position of the paper.

We claim as our invention:—

1. In a photographic camera, a camera body, means for positioning a sheet of photographic material in exposing position therein, and means for reversing said positioning means within the camera independently of the object matter to be photographed to present either side of said sheet for exposure for making independent photographs on opposite sides thereof.

2. In a photographic camera, a camera body, means associated therewith for positioning a sheet of photographic material sensitized on both sides for exposure to light reflected from different objects to be photographed, and means for shifting said positioning means to present either side of such sheet for exposure for making independent photographs of said objects on opposite sides thereof.

3. In a photographic camera, means for positioning a sheet of photographic material for exposure therein, said means being shiftable within the camera to present either side of such sheet toward the exposing lens, supply means carried by said positioning means for supplying said sheet to the latter, and means for feeding the sheet from said supply means to said positioning means.

4. In a photographic camera, a member carrying means for positioning a sheet of photographic material, said member being rotatable on an axis transverse to the optical axis of the camera to bring either side of such sheet into position for exposure, and means for severing portions from said sheet corresponding to such exposures.

5. In a photographic camera, a member rotatable on an axis transverse to the optical axis of the camera and carrying a pair of transparent plates for reversibly positioning a sheet of photographic material held between them in a plane which coincides with its axis of rotation to bring either side of said sheet into position for exposure.

6. In a photographic camera, the combination with the casing and lens, of a frame rotatably mounted on the casing and having means projecting into the casing transversely of the optical axis of the lens for reversibly positioning a sheet of photographic material in the focal plane of the lens, and optical erecting means independent of the object to be copied and located between the latter and said frame.

7. In a photographic camera, the combination with the casing and lens, of a frame mounted on the casing to rotate on an axis transverse to the optical axis of the lens, means carried by said frame for supplying photographic material, means carried by said frame and projecting into the casing across the optical axis of the lens for reversibly positioning such photographic material in the focal plane of the lens, feeding means on said frame for feeding said material from said supply means to said positioning means, and severing means for severing said material into portions corresponding to a pair of exposures made on opposite sides of said material by said reverse positioning.

8. The combination with a camera body and a support for a sheet of double coated sensitive material in the focal plane thereof, of object holding means, and means for rotating said support within the camera body independently of movement of said holding means, to present first one side and then the other side of the sensitive material for exposure to independent images of different objects.

9. In a camera having a chamber and a lens, a member for holding film in the focal plane of the lens, means for mounting the holder for movement in situ whereby the sides of the film are successively exposed to light admitted by the lens, and means for projecting on the opposite sides of said film reflected light images of different objects occupying unreversed positions relative to said mounting means.

10. In a camera, a camera body providing a dark chamber, means for admitting light to said chamber, comprising a lens, and means movable in said chamber and without opening the same to position opposite sensitized sides of a photographic material for exposure in the focal plane of said lens to light from said light admitting means.

11. In a camera, a camera body forming a dark chamber provided with means comprising a lens for admitting light thereinto from objects to be photographed located outside thereof, and a support movable in said chamber while the latter is maintained closed for positioning the opposite sensitized sides of a photographic material for exposure in the focal plane of said lens to light from said light admitting means.

12. In a camera, the combination with the casing and lens, of a support movable to present opposite sensitized sides of a photographic material in the focal plane of said lens, and erecting prism means for erecting images of objects to be photographed projected on said material.

13. In a camera, the combination with the casing and lens, of object holding means, and a support movable independently of said holding means to present opposite sensitized sides of a photographic material in the focal plane of said lens.

14. In a camera, the combination with the casing and lens, of adjustably positioned object holding means, a support movable to present opposite sides of a double-coated sensitive material in the focal plane of said lens, and focusing means for focusing images of objects carried by said holder on said material.

15. In a camera, the combination with the casing and lens, of a support movable to present opposite sides of a double-coated sensitive material in the focal plane of said lens, optical means for erecting images projected by said lens, and focusing means for focusing images of objects to be photographed on said material.

16. In a camera, the combination with the casing and lens, of object holding means adjustable in the direction of the optical axis, a support movable to present opposite sensitized sides of a material in the focal plane of said lens, optical means for erecting the projected images, and focusing means for focusing said images.

17. In a camera, the combination with the camera body and lens, of supporting means shiftable to present opposite sensitized sides of a photographic material for exposure in the focal plane, means for focusing the object images at said plane, supply means shiftable with said supporting means for supplying said material to the latter, and means for severing portions from said material corresponding to said double exposures.

18. In a camera, the combination with the camera body and lens, of a support shiftable to present opposite, sensitized sides of a photographic material for exposure in the focal plane, object holding means adjustable in the direction of the optical axis, means for focusing the object images, supply means shiftable with said supporting means for supplying said material to the latter, and means for severing portions from the said material corresponding to said exposures thereof on opposite sides.

19. In a camera, the combination with the camera body and lens, of supporting means shiftable to present opposite, sensitized sides of a photographic material for exposure in the focal plane, focusing means, supply means shiftable with said supporting means for supplying said material to the latter, and means for feeding said material from said supply means to said supporting means.

20. In a camera, the combination with the camera body and lens, of supporting means shiftable to present opposite, sensitized sides of photographic material for exposure in the focal plane, object holding means adjustable in the direction of the optical axis, focusing means, supply means shiftable with said supporting means for supplying said material to the latter and means for feeding said material from said supply means to said supporting means.

21. In a camera, the combination with the casing and lens, of a support shiftable to present opposite, sensitized sides of a photographic material for exposure in the focal plane, focusing means, object holding means adjustable in the direction of the optical axis, supply means shiftable with said support, feeding means for feeding said material from said supply means to said support, and means for severing portions of said material corresponding to said opposite exposures thereof.

22. In a photographic camera, the combination with supporting means for holding sensitized sheet material in a focal plane, of means for supplying sensitized sheet material to said supporting means, and sheet feeding devices, said supporting means, supplying means, and feeding devices being rotatable together as a unit to present either side of said sensitized material for exposure in said camera.

23. In a photographic camera, the combination with supporting means for holding sensitized sheet material in a focal plane, of means for supplying sensitized sheet material to said supporting means, sheet feeding devices, said supporting means, supplying means, and feeding devices being rotatable together as a unit to present either side of said sensitized material for exposure in said camera, and sheet severing mechanism for severing portions of said material corresponding to said exposures thereof.

24. In a photographic camera, the combination with a dark chamber having means for admitting light thereto, of a rotatable member including means for holding sensitized sheet material in the focal plane of the camera, means mounted on said rotatable member for holding a roll of said material in position so that portions of said sheet material may be supplied to said holding means, devices also mounted on said rotatable member for feeding successive portions of said roll of sensitized material into said holding means to be exposed, said rotatable member being movable to present either side of the sensitized material to the light admitted to the dark chamber so that exposures may be made on both sides of the sensitized material, and sheet severing mechanism for severing portions of said material corresponding to said exposures.

25. In a photographic apparatus, the combination with a camera body, of holding means for maintaining sensitized sheet material in the focal plane of the camera body, said holding means being movable to present the sensitized, opposite sides of said material to the action of light coming toward said material from one direction, so that two independent exposures may be made successively upon opposite sides of said material by shifting said holding means between such exposures, means mounted on said holding means and movable bodily therewith for supplying said material to said holding means, and sheet severing mechanism for severing portions of said material corresponding to said opposite exposures thereof.

26. In a photographic apparatus, the combination with a camera body, of holding means for maintaining a sheet of photographic material sensitized on both sides in the focal plane of the camera body, said holding means being movable to present either side of said material to the action of light coming toward said material from one direction, so that two independent exposures may be made successively upon opposite sides of said material by shifting said holding means between such exposures, means mounted on said holding means and movable bodily therewith for supplying said material to said holding means, and sheet severing mechanism mounted on the camera body for severing the exposed portions of said material from the unexposed portions thereof.

27. In a photographic apparatus, the combination with a camera body, of a turntable mounted for revolution about an axis substantially in the focal plane of the camera body, holding means mounted on said turntable and revoluble therewith for holding sensitized sheet material in the focal plane in position to be exposed, so that both sides of such material may be exposed by turning said turntable between exposures, means mounted on said turntable for holding a roll of said material in position to be unrolled and supplied to said holding means, feeding devices mounted on said turntable for feeding successive portions of said roll to said holding means, and sheet severing mechanism for severing the exposed portions of sheet material from the unexposed portions thereof.

28. In a photographic apparatus, the combination with a camera body, of a turntable mounted for revolution about an axis substantially in the focal plane of the camera body, holding means mounted on said turntable and revoluble therewith for holding sensitized sheet material in the focal plane in position to be exposed, so that both sides of such material may be exposed by turning said turntable between exposures, means mounted on said turntable for holding a roll of said material in position to be unrolled and supplied to said holding means, feeding devices mounted on said turntable for feeding successive portions of said roll to said holding means, and severing mechanism mounted on said camera body for severing the exposed portions of said material from the unexposed portions thereof.

In testimony whereof we have hereunto set our hands.

ARTHUR W. CAPS.
IVAN E. LEININGER.